(12) United States Patent
Nagano et al.

(10) Patent No.: US 12,112,767 B2
(45) Date of Patent: Oct. 8, 2024

(54) ACOUSTIC DATA AUGMENTATION WITH MIXED NORMALIZATION FACTORS

(71) Applicant: INTERNATIONAL BUSINESS MACHINES CORPORATION, Armonk, NY (US)

(72) Inventors: Toru Nagano, Taito-Ku (JP); Takashi Fukuda, Tokyo (JP); Masayuki Suzuki, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 398 days.

(21) Appl. No.: 17/326,463

(22) Filed: May 21, 2021

(65) Prior Publication Data
US 2022/0375484 A1 Nov. 24, 2022

(51) Int. Cl.
*G10L 21/00* (2013.01)
*G06N 20/00* (2019.01)
*G10L 19/02* (2013.01)
*G10L 25/27* (2013.01)

(52) U.S. Cl.
CPC .............. *G10L 21/00* (2013.01); *G06N 20/00* (2019.01); *G10L 19/02* (2013.01); *G10L 25/27* (2013.01)

(58) Field of Classification Search
CPC ......... G10L 21/00; G10L 19/02; G10L 25/27; G10L 15/063; G10L 15/065; G06N 20/00; G06N 3/0442; G06N 3/0464; G06N 3/0895
See application file for complete search history.

(56) References Cited

U.S. PATENT DOCUMENTS

| | | | |
|---|---|---|---|
| 5,950,157 A * | 9/1999 | Heck ....................... | G10L 17/20 704/250 |
| 7,567,903 B1 * | 7/2009 | Goffin ..................... | G10L 15/12 704/250 |
| 9,495,955 B1 * | 11/2016 | Weber .................... | G10L 15/063 |
| 10,217,456 B2 | 2/2019 | Ichikawa | |
| 10,418,030 B2 * | 9/2019 | Hanazawa .............. | G10L 15/22 |
| 10,460,727 B2 | 10/2019 | Droppo | |

(Continued)

FOREIGN PATENT DOCUMENTS

WO    WO-2017049350 A1 *    3/2017    ............. G06N 20/00

OTHER PUBLICATIONS

O. Kalinli, G. Bhattacharya and C. Weng, "Parametric Cepstral Mean Normalization for Robust Speech Recognition," ICASSP 2019—2019 IEEE International Conference on Acoustics, Speech and Signal Processing (ICASSP), Brighton, UK, 2019, pp. 6735-6739, doi: 10.1109/ICASSP.2019.8683674. (Year: 2019).*

(Continued)

*Primary Examiner* — Douglas Godbold
*Assistant Examiner* — Parker Mayfield
(74) *Attorney, Agent, or Firm* — Caleb D. Wilkes

(57) ABSTRACT

A method, computer system, and a computer program product for audio data augmentation are provided. Sets of audio data from different sources may be obtained. A respective normalization factor for at least two sources of the different sources may be calculated. The normalization factors from the at least two sources may be mixed to determine a mixed normalization factor. A first set of the sets may be normalized by using the mixed normalization factor and to obtain training data for training an acoustic model.

20 Claims, 11 Drawing Sheets

(56) References Cited

U.S. PATENT DOCUMENTS

| | | | |
|---|---|---|---|
| 2014/0337026 A1 | 11/2014 | Ichikawa | |
| 2018/0090154 A1* | 3/2018 | Aaron | H04L 12/1827 |
| 2018/0254040 A1 | 9/2018 | Droppo | |
| 2018/0308508 A1* | 10/2018 | Eyben | G06N 5/046 |
| 2019/0096392 A1 | 3/2019 | Hanazawa | |
| 2020/0365174 A1* | 11/2020 | Kang | G10L 21/0208 |
| 2022/0300711 A1* | 9/2022 | Elisco | G06N 3/08 |

OTHER PUBLICATIONS

Zajíc, Zbyněk, et al. "A cohort methods for score normalization in speaker verification system, acceleration of on-line cohort methods." (2007). (Year: 2007).*

Pervaiz et al., "Incorporating Noise Robustness in Speech Command Recognition by Noise Augmentation of Training Data", Sensors, MDPI, vol. 20, Issue 8, Apr. 19, 2020, 19 Pages, doi:10.3390/s20082326, https://www.mdpi.com/1424-8220/20/8/2326.

Bellegarda et al., "Self-Normalization vs. Statistics Update for Efficient Use of Additional Training Data" IP.com, IP.com No. IPCOM000113415D, Mar. 27, 2005, 3 Pages, https://priorart.ip.com/IPCOM/000113415.

Mell et al., "The NIST Definition of Cloud Computing", Recommendations of the National Institute of Standards and Technology, NIST Special Publication 800-145, Sep. 2011, 7 pages.

* cited by examiner

ACOUSTIC DATA AUGMENTATION WITH MIXED NORMALIZATION FACTORS

BACKGROUND

The present invention generally relates to acoustic data augmentation, and more particularly to artificial intelligence for speech recognition.

SUMMARY

According to an aspect of the present invention, a method for audio data augmentation is provided. Sets of audio data from different sources may be obtained. A respective normalization factor for at least two sources of the different sources may be calculated. The normalization factors from the at least two sources may be mixed to determine a mixed normalization factor. A first set of the sets may be normalized by using the mixed normalization factor and to obtain training data for training an acoustic model. A computer system and a computer program product corresponding to the above method are also disclosed herein.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a system, method, and computer program product for audio data augmentation. As such, the present embodiments have the capacity to improve the technical field of speech recognition in artificial intelligence. This improvement may include achieving more robust recognition of voices which have different cepstral means and variances.

Many of the embodiments of the present invention include artificial intelligence, machine learning, and model training in particular. A model usually starts as a configuration of random values. Such untrained models must be trained before they can be reasonably expected to perform a function with success. Many of the processes described herein are for the purpose of training acoustic models. Once trained, acoustic models can be used for speech recognition, and may not require further training. In this way, a trained acoustic model is a product of the process of training an untrained model.

Acoustic models are trained by audio data. Machine-coded text can accompany the audio data for being input into a machine learning model. This feeding of machine-coded text may constitute supervised training of the acoustic model, so that the machine learning model may learn to recognize the textual meaning of spoken words that are recorded in the audio data. In order to train robust acoustic models, diverse audio data may be necessary. However, conventional acoustic models are not sufficiently robust due to limited diversity of audio data. The present embodiments may include mixing normalization of audio data from multiple speakers in order to simulate a situation of a speaker speaking in a different acoustic environment. The present embodiments also help speech recognition artificial intelligence to better process and recognize speech in a multi-speaker conversation where the various speakers, e.g., persons speaking, have different cepstral means and variances.

Figure 1A:
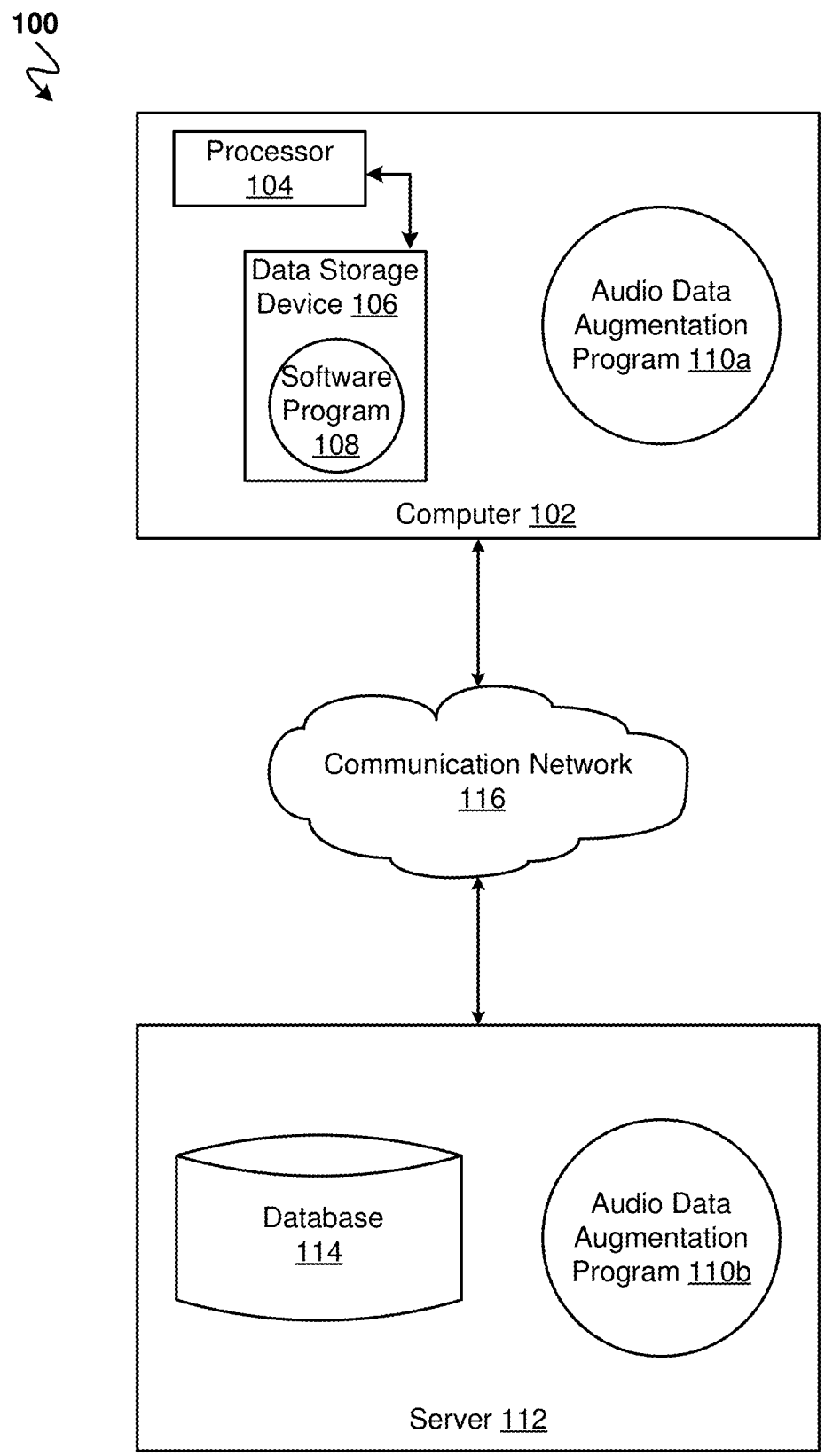
FIG. 1A illustrates a networked computer environment according to at least one embodiment.

Referring to FIG. 1A, an exemplary networked computer environment 100 in accordance with one embodiment is depicted. The networked computer environment 100 may include a computer 102 with a processor 104 and a data storage device 106 that is enabled to run a software program 108 and an audio data augmentation program 110a. The networked computer environment 100 may also include a server 112 that is enabled to run an audio data augmentation program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 9, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the audio data augmentation program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the audio data augmentation program 110a, 110b (respectively) to augment audio data to enable more robust speech recognition in artificial intelligence. The audio data augmentation method is explained in more detail below with respect to FIGS. 1B-8.

Figure 1B:
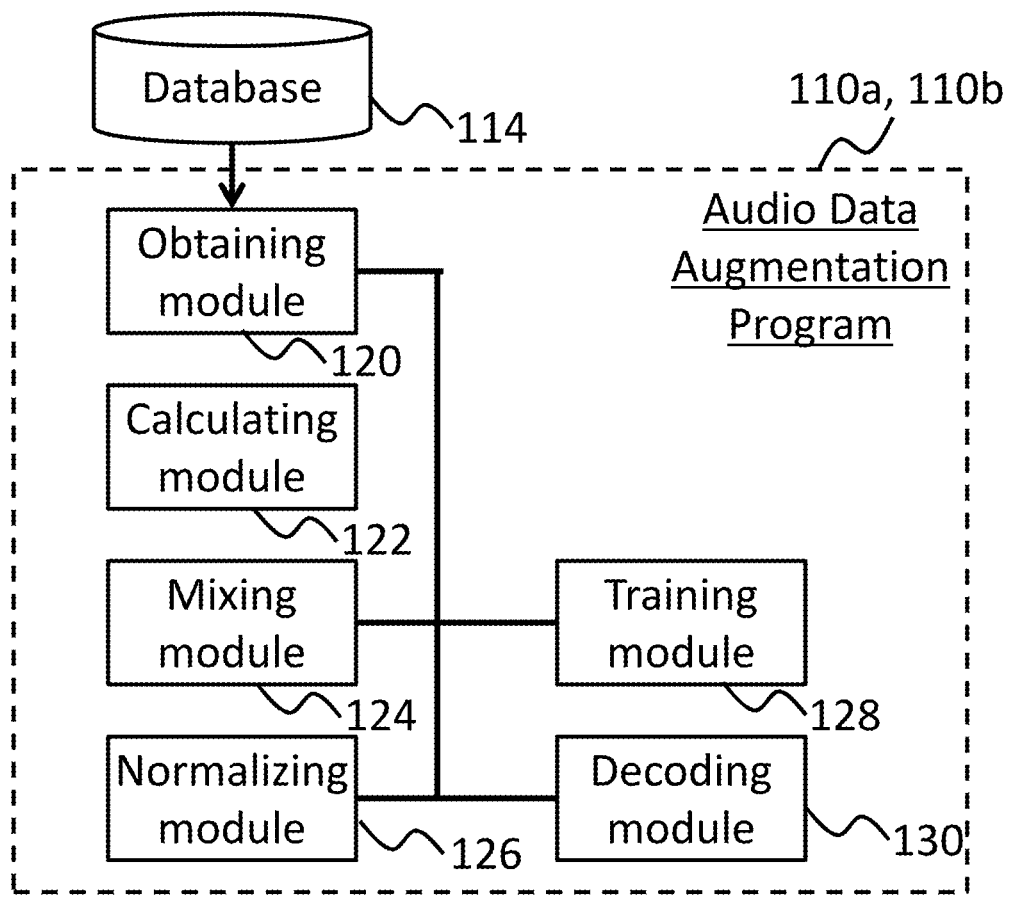
FIG. 1B shows an exemplary configuration of an audio data augmentation program according to an embodiment of the present invention.

FIG. 1B shows an exemplary configuration of the audio data augmentation program 110a, 110b according to an embodiment of the present invention. The audio data augmentation program 110a, 110b may augment training data by using mixed normalization factors. The augmented training data may be used to train an acoustic model.

The audio data augmentation program 110a, 110b may be configured to cause a processor and/or programmable circuitry to perform an audio data augmentation method as described herein. The audio data augmentation program 110a, 110b may be stored as instructions on one or more computer readable mediums. The instructions may be embodied on the computer readable medium and/or on the programmable circuitry. The instructions, when executed by the processor or the programmable circuitry, may cause the processor or the programmable circuitry to operate as a plurality of operating modules.

Thereby, the audio data augmentation program 110a, 110b may include an obtaining module 120, a calculating module 122, a mixing module 124, a normalizing module 126, a training module 128, and a decoding module 130.

The audio data augmentation program 110a, 110b may connect with the data storage device 106 or with the database 114 to access information or data that is stored on same and that is used for processing. Memory of the computer 102 or of the server 112 may also store a variety of data/instructions used for operations of the audio data augmentation program 110a, 110b.

One or more of the modules of audio data augmentation program 110a, 110b (e.g., the obtaining module 120 and the calculating module 122) may communicate data directly or via the data storage device 106, the database 114, or via other memory of the computer 102 or of the server 112.

Memory of the computer 102 and/or of the server 112 may be implemented as volatile or non-volatile memory. In some embodiments, the memory may store audio data, normalization factors, a trained acoustic model, other parameters, and data related thereto.

The obtaining module 120 obtains a plurality of sets of audio data from different sources. For example, the obtaining module 120 may obtain a first set of audio data from a first source, and a second set of audio data from a second source. The audio data may include raw speech data, log Mel-filtered spectra derived from raw speech data, and/or Mel-Frequency Cepstrum Coefficients transformed from raw speech data. The log Mel-filtered spectra may include log Mel-filtered bank spectra. The audio data may include acoustic features, such as the log Mel-filtered spectra and/or the Mel-Frequency Cepstrum Coefficients, having been extracted from the raw speech data. In some embodiments, this extraction may be an additional step for the audio data augmentation process.

The calculating module 122 may calculate a normalization factor for every different source. For example, the calculating module 122 may calculate a first normalization factor from the first set of audio data that was generated by a first source and may calculate a second normalization factor from the second set of audio data that was generated by a second source different from the first source. Some audio data, whether for the same audio data set itself or for another audio data set, is used as basis or input for calculating the normalization factor.

The mixing module 124 may mix the normalization factors from at least two different sources to determine or estimate a mixed normalization factor. For example, the mixing module 124 may mix the first normalization factor and the second normalization factor to determine or estimate a mixed normalization factor. In one embodiment, the mixing module 124 may calculate a weighted mean of the first normalization factor and the second normalization factor as the mixed normalization factor.

The normalizing module 126 may normalize at least one of the sets of audio data by using the mixed normalization factor. For example, the normalizing module 126 may normalize the first set of audio data by using the mixed normalization factor that is determined using the first normalization factor and the second normalization factor. The normalizing module 126 may provide the normalized set to be or to be a part of training data for training an acoustic model as a result of the normalization.

The training module 128 may train an acoustic model by using the training data that is produced by the normalizing module 126. The training data may include at least the set of audio data that was normalized with the mixed normalization factor. The training data may include other sets of audio data.

The decoding module 130 may decode audio data by using the acoustic model to generate sound identification information from the acoustic model. The decoding module 130 may be involved in speech recognition as is used in various artificial intelligence systems such as speech-to-text programs, where a person speaks into a microphone connected to a device and the device produces text from the words verbally spoken by the person.

Figure 2A:
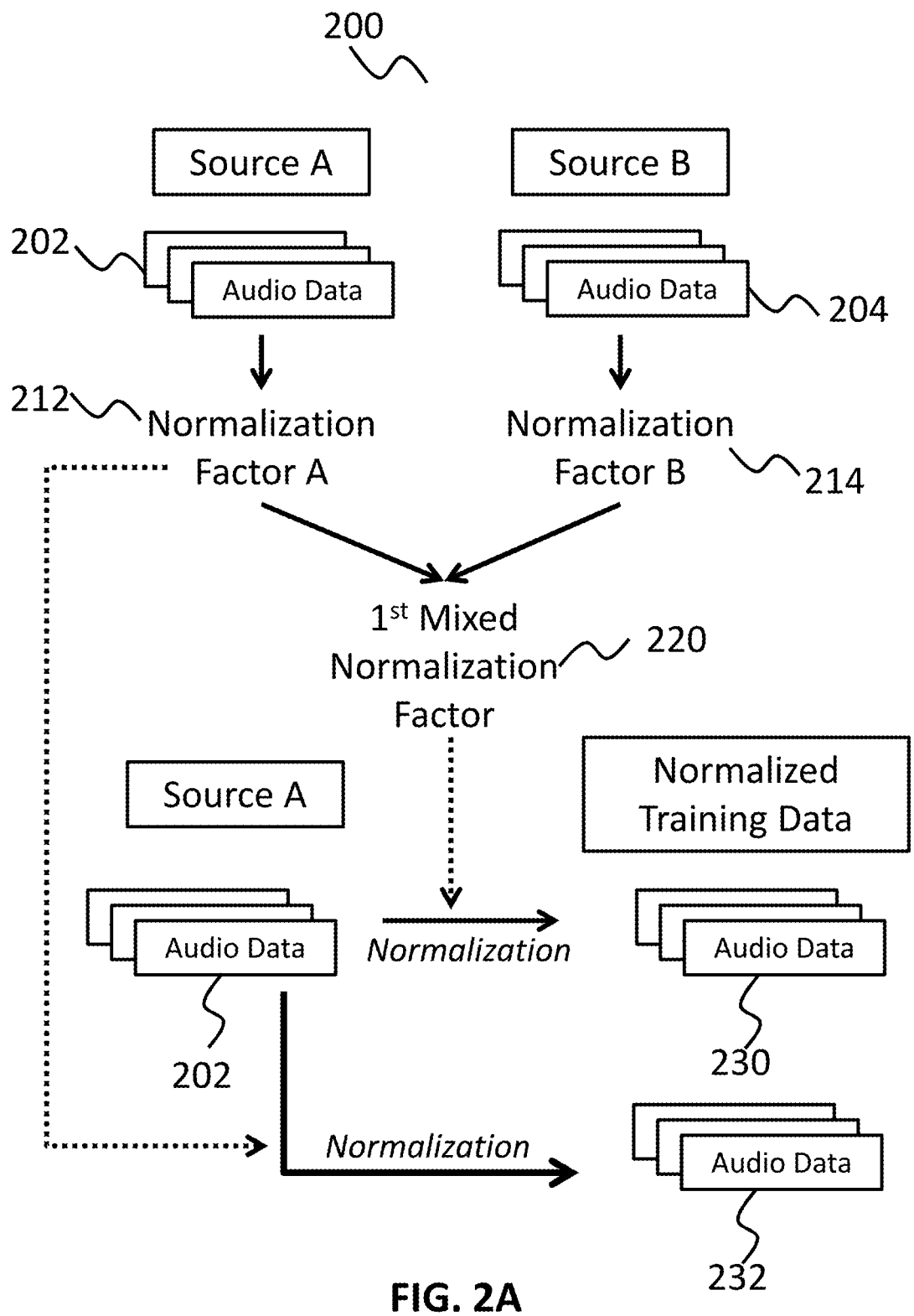
FIG. 2A shows an exemplary outline of an audio data augmentation process according to an embodiment of the present invention.

FIG. 2A shows an exemplary outline of a first audio data augmentation process 200 according to an embodiment of the present invention. Normalization factor A 212 may be calculated from a first set 202 of audio data that was generated from Source A. Normalization factor B 214 may be calculated from a second set 204 of audio data that was generated from Source B that is different from Source A. In some embodiments, Source A may be a first person speaking and Source B may be a second person speaking.

Further in this embodiment of FIG. 2A, a first mixed normalization factor 220 may then be calculated from the normalization factor A 212 and from the normalization factor B 214. Then the first set 202 of audio data from Source A may be normalized from the first mixed normalization factor 220 so that, thereby, a first normalized set 230 of audio data is produced and obtained. The first set 202 of audio data may also be normalized from the normalization factor A 212 so that, thereby, a second normalized set 232 of audio data is obtained.

The second set 204 of audio data may also be normalized from the normalization factor B 214. The second set 204 may further be normalized from the first mixed normalization factor 220. In such an embodiment, four sets of normalized audio data may be obtained. These four sets may include the second normalized set 232 that was normalized by the normalization factor A 212, the first normalized set 230 that was normalized by the first mixed normalization factor 220, a third normalized set formed by the second set 204 being normalized by the second normalization factor B 214, and a fourth normalized set being formed by the second set 204 being normalized by the first mixed normalization factor 220. Furthermore, the first set 202 being normalized by the normalization factor B 214 may generate an additional set of normalized audio data. The second set 204 being normalized by the normalization factor A 212 may also generate another additional set of normalized audio data.

An acoustic model may be trained with training data. The training data may include the first normalized set 230 that was normalized from the first set 202 with the first mixed normalization factor 220. The training data may further include the second normalized set 232. The training data may include some or all of the other above-mentioned normalized sets.

As such, training data may include a set of audio data normalized by a normalization factor derived at least partially from another set of audio data. For example, training data may include the first set 202 that was normalized by the first mixed normalization factor 220 which was derived partially from the first set 202 and partially from the second set 204. The training data may also include a set of audio data normalized by a normalization factor derived solely from the set itself. For example, the training data may include the second normalized set 232 that was generated by using the normalization factor A 212 to normalize the first set 202. This combination of multiple normalized sets of audio data in the training data may be referred to as an enhanced set of training data. With such an enhanced set of training data, an acoustic model may become more robust than an acoustic model that is trained with a set of audio data normalized by itself and with no other normalization.

Moreover, obtaining the improved acoustic model with increased robustness may be achieved with fewer computational resources when such an enhanced set of training data is used for training Large amounts of computational resources have previously been required to improve robustness of acoustic models when such enhanced training data was not used.

Figure 2B:
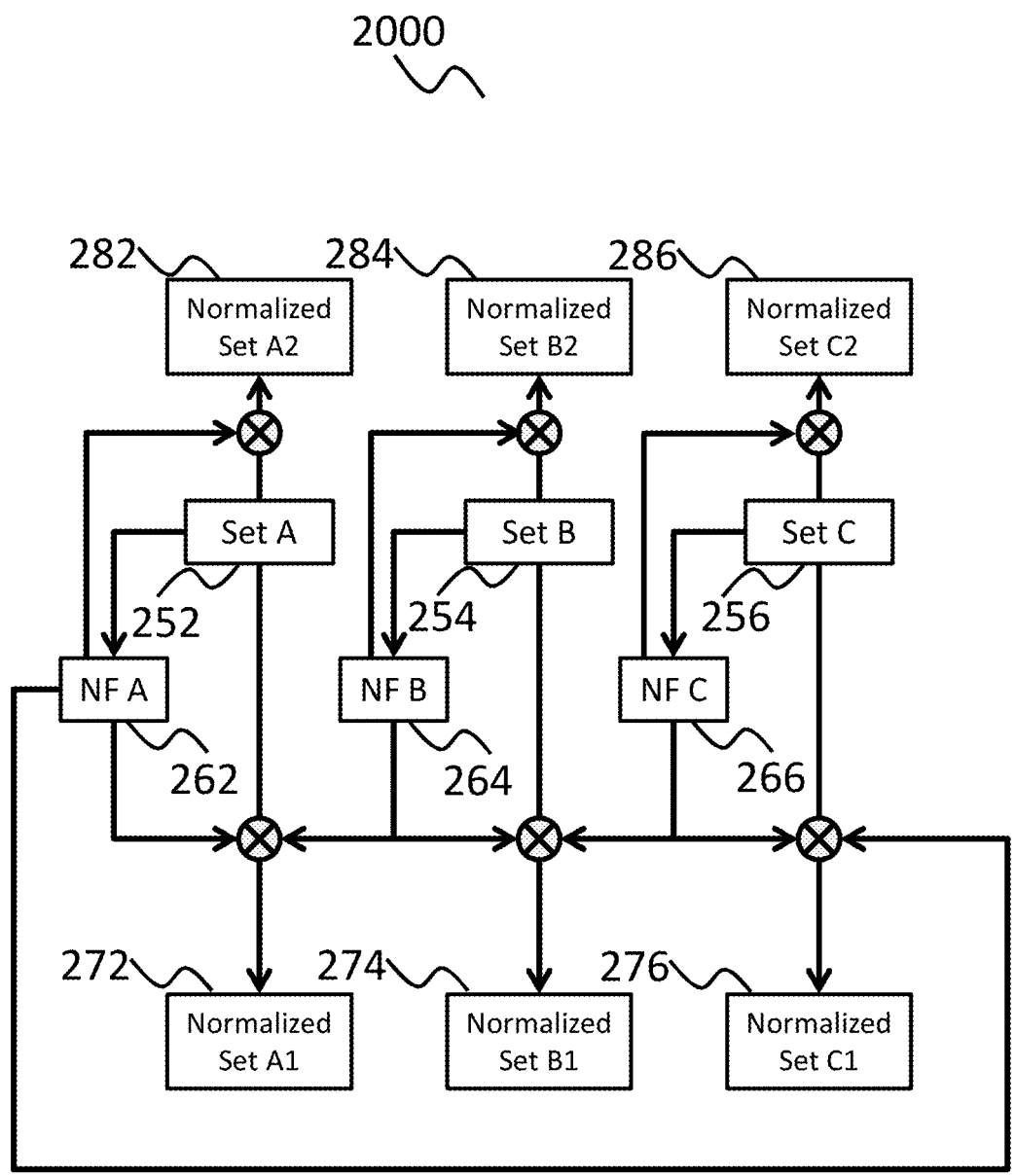
FIG. 2B shows an exemplary outline of an audio data augmentation process according to another embodiment of the present invention.

FIG. 2B shows an exemplary outline of a second audio data augmentation process 2000 according to another embodiment of the present invention. In FIG. 2B, a set A 252 is a set of audio data that was generated from Source A, a set B 254 is a set of audio data from Source B, and a set C 256 is a set of audio data from Source C. Sources A, B, and C may be different persons who have different voices. A normalization factor A 262 may be calculated from the set A 252, a normalization factor B 264 may be calculated from the set B 254, and a normalization factor C 266 may be calculated from the set C 256.

With this embodiment of FIG. 2B, a normalized set A1 272 may be generated by normalizing the set A 252 with a mixed normalization factor that was formed by mixing the normalization factor A 262 and the normalization factor B 264. A normalized set B1 274 may be generated by normalizing the set B 254 with a mixed normalization factor that was formed by mixing the normalization factor B 264 and the normalization factor C 266. A normalized set C1 276 may be generated by normalizing the set C 256 with a mixed normalization factor that was formed by mixing the normalization factor C 266 and the normalization factor A 262.

As is further illustrated in FIG. 2B, in some embodiments a normalized set A2 282 may be generated by normalizing the set A 252 with the normalization factor 262. A normalized set B2 284 may be generated by normalizing the set B 254 with the normalization factor 264. A normalized set C2 286 may be generated by normalizing the set C 256 by the normalization factor 266. An acoustic model may be trained using one or more of the normalized sets A1 272, B1 274, C1 276, A2 282, B2 284, and C2 286. Enhanced training data may include combinations of normalized data sets, e.g., a combination of normalized set A1 272 and normalized set A2 282, a combination of normalized set B1 274 and normalized set B2 284, or a combination of normalized set C1 276 and normalized set C2 286.

Figure 3:
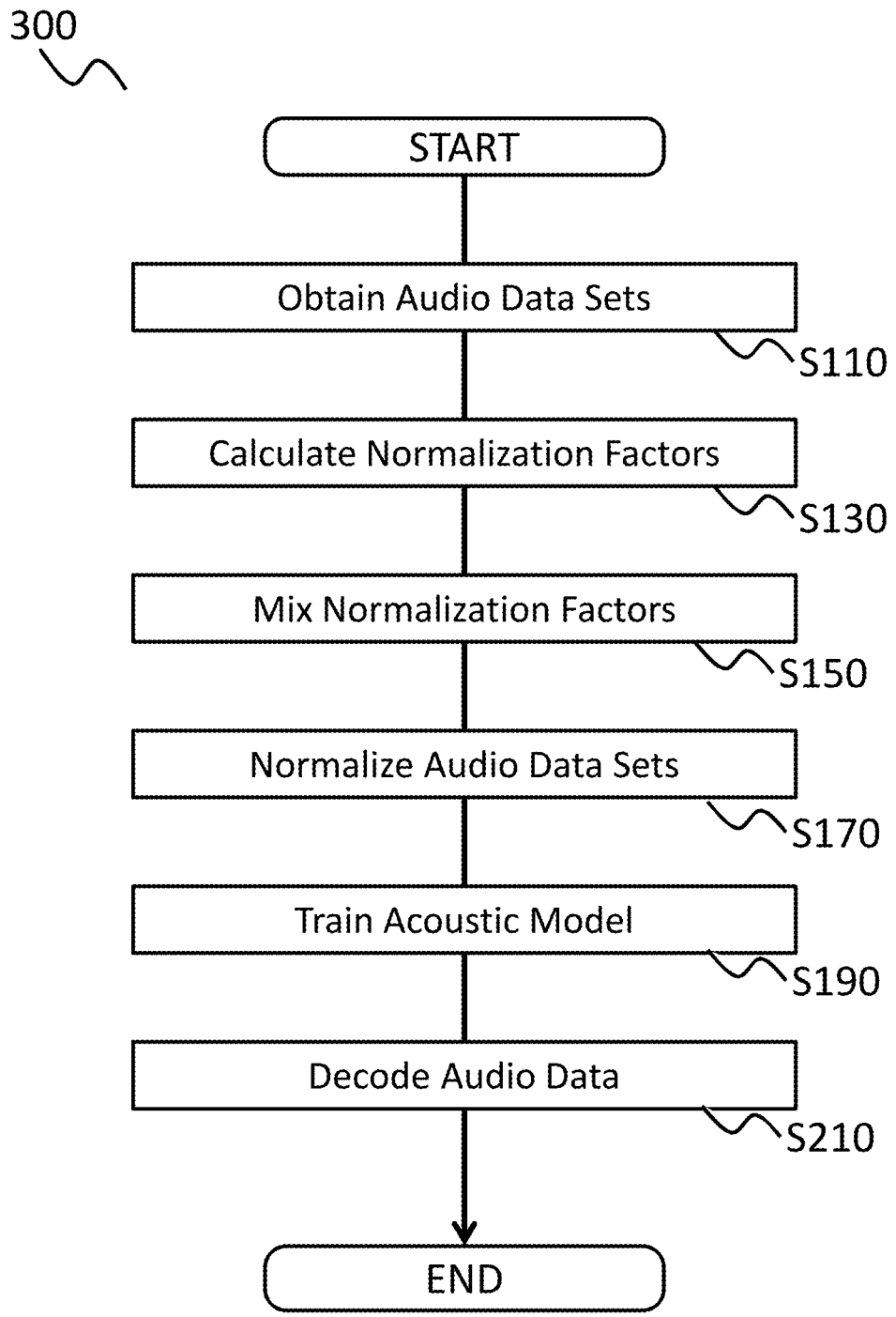
FIG. 3 shows an operational flowchart according to an embodiment of the present invention.

FIG. 3 shows an operational flowchart 300 according to an embodiment of the present invention. The operational flowchart 300 describes an example in which an audio data augmentation program 110a, 110b performs steps S110 to S210 to train and utilize an acoustic model.

At step S110 of the operational flowchart 300, audio data sets are obtained. The obtaining module 120 may perform step S110 by obtaining sets of audio data. The sets may respectively be from different sources. The different sources may have been generated from different speakers. The obtaining performed by the obtaining module 120 may include the obtaining module 120 retrieving the sets of audio data from a database such as the database 114. In some embodiments, the obtaining may include using a microphone, e.g., the microphone 932 shown in FIG. 9, that is connected to the computer 102 to record words that are spoken from or utterances that are uttered by different persons or under different conditions. The audio data may be digitized human speech data or artificial speech data. The audio data may include one or more of raw speech data, log Mel-filtered spectra generated from the raw speech data, Mel-Frequency Cepstrum Coefficients transformed from the raw speech data, and other features derived from the raw speech data.

In an embodiment, the obtaining module 120 may obtain raw speech data from the database and may itself generate log Mel-filtered spectra or Mel-Frequency Cepstrum Coefficients from the raw speech data.

The different sources may include different speakers, different speaker attributes, and/or different recording conditions. In other words, the audio sets that are obtained may include sets of audio data from a single speaker who was speaking in different respective recording conditions for each set. The audio sets may be generated from a single speaker who was speaking with different voice attributes for different audio sets, respectively. For example, a first person speaking with a high pitch in a first recording session and with a lower pitch in a second recording session. The audio sets may be generated from different speakers which may imply different speaker attributes for the different speakers. The audio sets from different speakers may be generated with different or common recording conditions.

Speaker attributes may include voice intensity, pitch, harmonics, age (or age group), region, native language, dialect, and/or physical status.

One set of audio data may include a grouping by speaker attributes, whereby for normalization each of the sets corresponds to a different group focused on a level or type of speaker attribute. For example, a first set of audio data may include recordings of utterances from speakers with a high pitch, a second set of audio data may include recordings of utterances from speakers with a mid-range pitch and a third set of audio data may include recordings of utterances from speakers with a low pitch.

The recording conditions may be affected by various factors, for example, room size, distance between a speaker and a recorder, e.g., a microphone, noisiness, reverberation, traffic volume, and/or type, age, and/or quality of recording equipment.

In an embodiment, sets of audio data may be grouped by unsupervised clustering. For example, the sets of audio data may be grouped by unsupervised learning.

Figure 4:
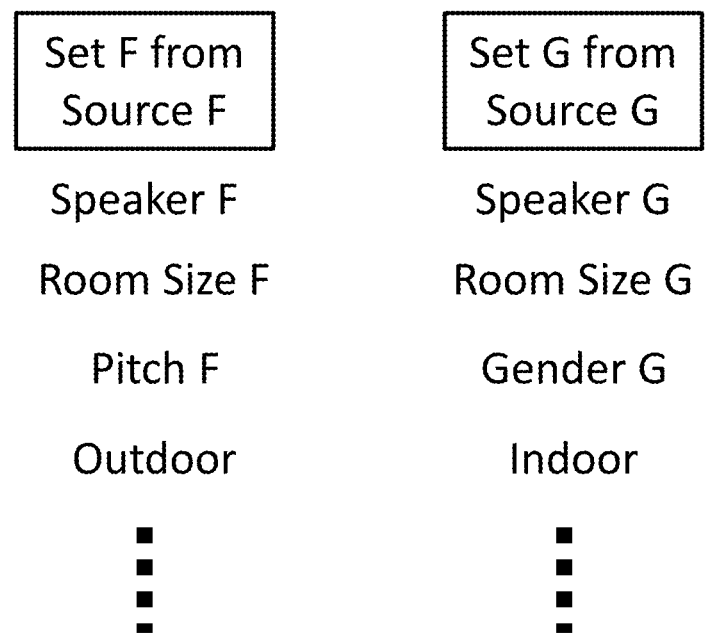
FIG. 4 shows lists of characteristics for sets of audio data according to an embodiment of the present invention.

FIG. 4 shows two lists of audio data characteristics according to an embodiment of the present invention. The obtaining module 120 may obtain a set F of audio data from Source F and a set G of audio data from Source G.

In an embodiment, the set F may include audio data that was generated from a Speaker F, while the set G may include audio data that was generated from a Speaker G. The sets F and G may include features of log Mel-filtered spectra from Speakers F and G, respectively.

The set F may include audio data recorded in a room having a room size F. The audio data may include log Mel-filtered spectra that was derived from speech data recorded at a large room having a room size F. The set G may include audio data recorded in a rooms that has a room size G. The audio data may include log Mel-filtered spectra that was derived from speech data recorded at a small room having a room size G.

The set F may include audio data recorded outdoors, while the set G may include audio data recorded indoors. For example, the outdoor recording may occur at a park. The indoor recording may occur in a building or house and may occur in an individual room of same. The audio data may include log Mel-filtered spectra derived from speech data.

In an embodiment, the set F may include audio data of speakers of with a Pitch F, while the set G may include audio data of speakers of Pitch G that is higher than Pitch F. For example, a first set of audio data may include log Mel-filtered spectra derived from speech data of individuals with a pitch lower than a threshold value. A second set of audio data may include log Mel-filtered spectra derived from speech data of individuals with a pitch higher than the threshold value.

In an embodiment, the set of audio data may include audio data of multiple time periods. For example, the set of audio data from Source A may include portions $x_A[1]$, $x_A[2]$, $x_A[3]$, ..., $x_A[T]$, where $x_A[t] (1<=t<=T)$ represents audio data from Source A at the t-th time period.

In the embodiment of FIG. 4, the obtaining module 120 may obtain two sets, i.e., set F and set G, of audio data from a Source F and from a Source G, respectively. In other embodiments, the obtaining module 120 may obtain three or more sets of audio data from three or more sources, respectively.

At step S130 of the operational flowchart 300, normalization factors are calculated. The calculating module 122 may perform step S130 by calculating a normalization factor for some or all of the sources from which the sets of audio data that were obtained at step S110 were generated. For example, the calculating module 122 may calculate a normalization factor F from the audio set F that was generated from the source F and may calculate a normalization factor G from the audio set G that was generated from the source G. Some audio data, whether for the same audio data set itself or for another audio data set, is used as basis or input for calculating the normalization factor.

Normalization of a set of audio data helps minimize distortions that may enter due to noise contamination and due to speaker attributes from different speakers. Two different people may pronounce the same sentence or phrase differently due to natural or controlled features of their voice, and a machine learning model performing speech recognition may become confused from the different factors and not recognize that the different speakers are speaking the same sentence. Normalization of a set of audio data may help achieve rapid model convergence for machine learning. Normalization may allow the comparison of corresponding normalized values for different datasets in a way that eliminates the effects of certain gross influences. A normalization factor may be calculated and then used to normalize a set of audio data.

In at least some embodiments, the normalization will be a z-score normalization and the normalization factor for the z-score normalization may include a mean value and/or a standard deviation. The calculating module 122 may obtain a mean value $m_F$ by calculating with the formula: $(x_F[1]+x_F[2]+x_F[3]+ ... +x_F[T])/T$. In the embodiment, the calculating module 122 may obtain a mean value $m_G$ by calculating with the formula: $(x_G[1]+x_G[2]+x_G[3]+ ... +x_G[T])/T$. In the embodiment, the calculating module 122 may obtain a standard deviation $s_F$ by calculating with the formula: $[(x_F[1]^2-m_F^2)^{1/2}+(x_F[2]^2-m_F^2)^{1/2}+(x_F[3]^2-m_F^2)^{1/2}+ ... +(x_F[T]^2-m_F^2)^{1/2}]/T$. In the embodiment, the calculating module 122 may obtain a standard deviation $s_G$ by calculating with the formula: $[(x_G[1]^2-m_G^2)^{1/2}+(x_G[2]^2-m_G^2)^{1/2}+(x_G[3]^2-m_G^2)^{1/2}+ ... +(x_G[T]^2-m_G^2)^{1/2}]/T$. Thus, the mean value that was calculated may then be used to help calculate the standard deviation.

The normalization factors may include a mean normalization of cepstral of log Mel, a mean and variance normalization of cepstral of log Mel, and/or a histogram equalization.

At step S150 of the operational flowchart 300, normalization factors are mixed. The mixing module 124 may perform this step S150 by mixing the normalization factors obtained at step S130 to obtain a mixed normalization factor. In at least some embodiments, the mixing performed by the mixing module 124 may include calculating a weighted mean of the normalization factors from at least two different sources, e.g., calculation a weight mean of two of the normalization factors that were calculated in step S130 by the calculating module 122. For example, the mixing module 124 may mix the normalization factor F of the set F and the normalization factor G of the set G.

In at least some embodiments, the mixing module 124 may calculate a mixed normalization factor $c_{mix}$, by calculating with the formula: $\Sigma a_i \times c_i$, where $c_i$ is a normalization factor of the i-th set (i-th source), and $a_i$ is a i-th weight which is in a range of $0<a_i<1$, and $\Sigma a_i=1$. In a specific embodiment, the mixing module 124 may calculate a mixed normalization factor $c_{mix}$ by calculating the formula: $a \times c_j + (1-a)c_j$, where $c_i$ is a normalization factor of the i-th set (i-th source), $i \neq j$, and a is a weight which is in a range of $0<a<1$. For example, when $(m_F, s_F)$ and $(m_G, s_G)$ are the normalization factors of the set F and the set G, the mixing module 124 may calculate the formula $0.5 \times (m_F, s_F) + 0.5 \times (m_G, s_G)$ to obtain a mixed normalization factor represented by the second point 532 $(m_{mix}, s_{mix})$.

Figure 5:
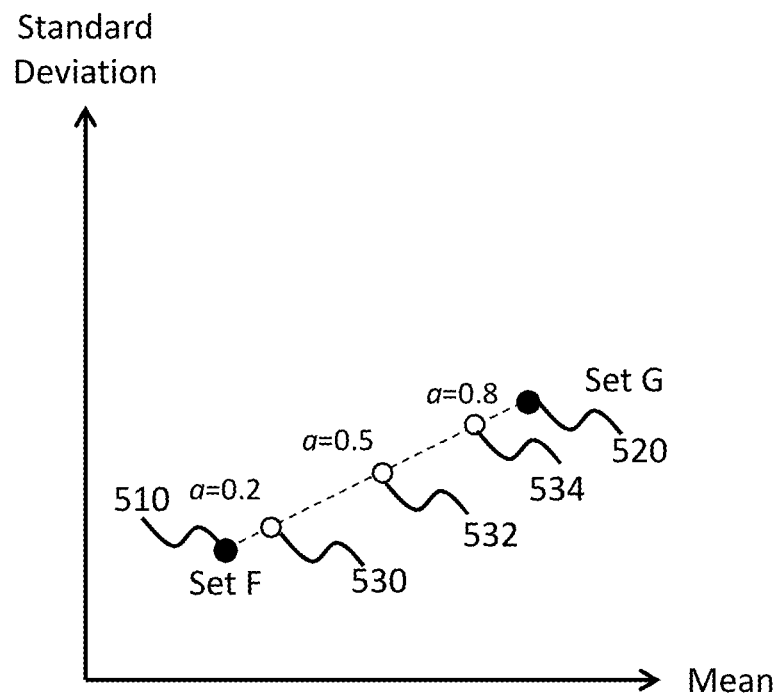
FIG. 5 shows a diagram illustrating variants of mixing normalization factors according to an embodiment of the present invention.

FIG. 5 shows the mixing of normalization factors according to an embodiment of the present invention. In an embodiment where normalization factors include a mean value and a standard deviation, normalization factors may be plotted on a graph as is shown in FIG. 5 where a horizontal line shows a mean value and a vertical line shows a standard deviation.

In FIG. 5, the normalization factor F 510 from the set F is represented by a point on the graph, and the normalization factor G 520 from the set G is represented by another point on the graph. Different possibilities exist for a mixed normalization factor of the normalization factors F and G depending on a weight value and are shown with the three different mixed normalization factors represented by points on the graph.

When a weight a is a small value (e.g., 0.2), the mixed normalization factor represented by first point 530 is located near the normalization factor A 510. When a weight a is a large value (e.g., 0.8), the mixed normalization factor represented by the third point 534 is located near the normalization factor B 520. When a weight a is 0.5, the mixed normalization factor is located at a middle point, e.g., an exact middle point, between the normalization factor F 510 and the normalization factor G 520 and is represented by second point 532.

As shown in FIG. 5, in this embodiment the mixed normalization factors represented by the first, second, and third points 530, 532, 534 are located on a line between the normalization factor F 510 and the normalization factor G 520. In other words, in this embodiment the mixed normalization factors are estimated by interpolation of the normalization factor F 510 and the normalization factor G 520. In an embodiment of FIG. 5, an extent to which the normalization factors of the set F and the set G are included, may be determined by the weight a.

In an embodiment of FIG. 5, the set F and/or the set G may be normalized (later at step S170) by using at least one of the mixed normalization factors that are represented by the first, second, and third points 530, 532, and 534.

Figure 6:
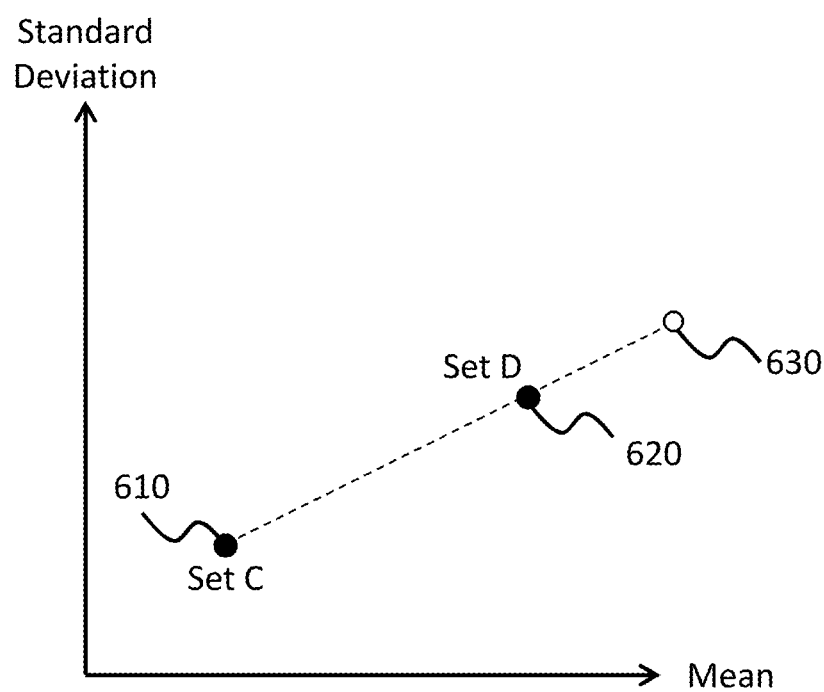
FIG. 6 shows a diagram illustrating mixing normalization factors according to another embodiment of the present invention.

FIG. 6 shows the mixing normalization factor according to another embodiment of the present invention. In an embodiment of FIG. 6, the mixing module 124 may estimate the mixed normalization factors by calculating an extrapolation of the normalization factors from at least two different sources, e.g., from a source C and from a source D.

The mixing module 124 may calculate an extrapolated mixed normalization factor 630 by calculating an extrapolation of the normalization factor C 610 and the normalization factor D 620. For example, the mixing module 124 may calculate the formula $-0.5 \times (m_C, s_C) + 1.5 \times (m_D, s_D)$ to obtain an extrapolated mixed normalization factor 630 $(m_{mix}, s_{mix})$.

For the embodiment shown in FIG. 6, the audio data set C and/or the audio data set D may be normalized (later at step S170) by using the extrapolated mixed normalization factor 630.

Figure 7:
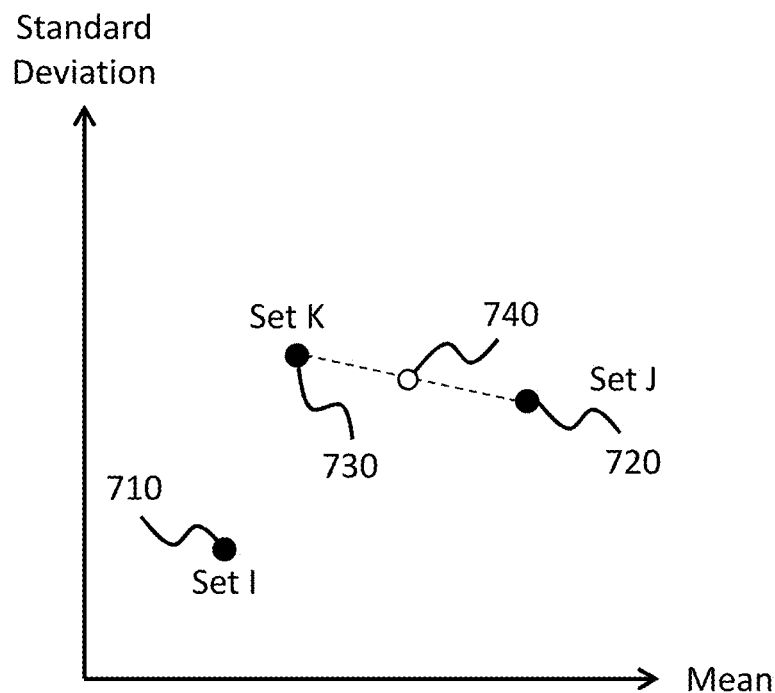
FIG. 7 shows a diagram illustrating mixing normalization factors according to another embodiment of the present invention.

FIG. 7 shows the mixing normalization factor according to another embodiment of the present invention. In an embodiment of FIG. 7, the mixing module 124 may determine or estimate an external mixed normalization factor 740 by calculating an interpolation or an extrapolation of the normalization factors of sets that are not normalized by this mixed normalization factor. In an embodiment of FIG. 7, the set I may be normalized (later at step S170) by using the external mixed normalization factor 740 calculated from the set J and from the set K.

The mixing module 124 may calculate the external mixed normalization factor 740 by calculating an interpolation of the normalization factor J 720 and the normalization factor K 730. For example, the mixing module 124 may calculate the formula $0.5 \times (m_J, s_J) + 0.5 \times (m_K, s_K)$ to obtain an external normalization factor 740 $(m_{mix}, s_{mix})$.

In the embodiments explained in relation to FIGS. 5-7, the mixing module 124 mixes two normalization factors. In at least some embodiments, the mixing module 124 may mix three or more normalization factors.

Figure 8:
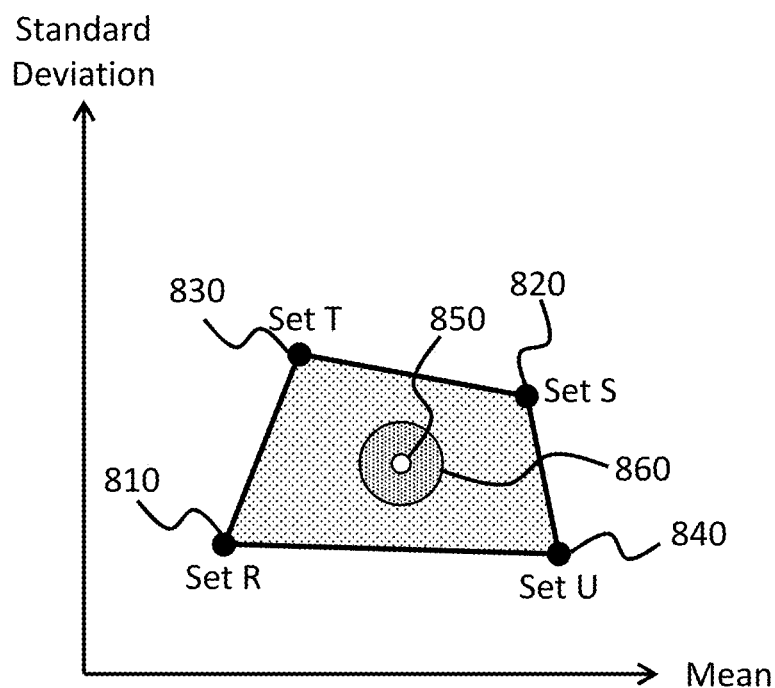
FIG. 8 shows a diagram illustrating mixing normalization factors according to another embodiment of the present invention.

FIG. 8 shows an example of the mixing of normalization factors according to another embodiment of the present invention in which more than two normalization factors are mixed. In an embodiment of FIG. 8, the mixing module 124 may determine or estimate the mixed normalization factor by calculating a weighted average of four normalization factors.

The mixing module 124 may calculate the mixed normalization factor 850 by calculating a weighted average of the normalization factor R 810, the normalization factor S 820, the normalization factor T 830, and the normalization factor U 840. For example, the mixing module 124 may calculate the formula $a_1 \times (m_R, s_R) + a_2 \times (m_S, s_S) + a_3 \times (m_T, s_T) + a_4 \times (m_U, s_U)$ to obtain a mixed normalization factor $(m_{mix}, s_{mix})$, where $0<a_1, a_2, a_3, a_4<1$ and $a_1+a_2+a_3+a_4=1$.

By adjusting weights (i.e., $a_1$, $a_2$, $a_3$, $a_4$), the mixing module 124 may calculate the mixed normalization factor 850 so as to be located at any point within a quadrilateral that includes the normalization factor R 810, the normalization factor S 820, the normalization factor T 830, and the normalization factor U 840, e.g., includes the normalization factor R 810, the normalization factor S 820, the normalization factor T 830, and the normalization factor U 840 as corners of the quadrilateral. In an embodiment of FIG. 8, one or more of audio set R, audio set S, audio set T and/or audio set U may be normalized (later at step S170) by using the mixed normalization factor 850.

In an embodiment, the mixing module 124 may adjust the weights such that the mixed normalization factor is located on or close to an edge of the quadrilateral. Thereby, the acoustic model may become more robust.

In an embodiment, the mixing module 124 may adjust the weights such that the mixed normalization factor is located near to a center the quadrilateral (e.g., a central area 860 shown in FIG. 8). Thereby the acoustic model may be more stably trained.

In an embodiment, the mixing module 124 may adjust the weights such that the larger the difference between a first set and another set, the smaller a weight for the other set becomes. For example using the embodiment shown in FIG.

8, assuming that the set U is farther away from Set R than Set S is, and assuming that the Set A will receive a highest weight priority as being a most important audio data set, a weight $a_4$ for the set U, which is the most distant from the set R, may be smaller than the other weights for the other three sets of audio data. A weight $a_2$ for the set S, which is the second most distant from the set R, may be smaller than weights $a_1$ and $a_3$ but larger than $a_4$. A weight $a_3$ for the set T, which is the nearest from the set R, may be smaller than weight $a_1$ but larger than the weights $a_4$ and $a_2$. A distant set of audio data may indicate a larger amount of similarity from audio data within the group which may mean that this set would be less helpful to train a robust model. For example, an audio set generated from different speakers having similar voices may be distant from an audio set generated from different speakers having substantially different voices. The set with more similarity may be given a smaller weight as compared to another set or other sets which gave greater internal dissimilarity.

The mixing module 124 may calculate the mixed normalization factor for one or more of all combinations of the normalization factors calculated at step S130. For example similar to the embodiment of FIG. 7, the mixing module 124 may calculate mixed normalization factors for a pair of the normalization factor I 710 and the normalization factor J 720, a pair of the normalization factor I 710 and the normalization factor K 730, a pair of the normalization factor J 720 and the normalization factor K 730, and a combination of the normalization factor I 710, the normalization factor J 720, and the normalization factor K 730.

At step S170 of the operational flowchart 300, the audio data sets are normalized. The normalizing module 126 may normalize the plurality of sets of audio data that were obtained at step S110 by using the normalization factors that were obtained at step S130 and/or the mixed normalization factor that was obtained at step S150. Normalization may be performed with normalization algorithms that are part of the normalizing module 126 and part of the audio data augmentation program 110*a*, 110*b*.

The normalizing module 126 may normalize at least a part of the plurality of sets of audio data by using their own normalization factor obtained at S130. For example, the normalizing module 126 may normalize the set F with the normalization factor F, and the normalizing module 126 may normalize the set G with the normalization factor G. The set F normalized with the normalization factor F may be referred to as "normalized set F."

The normalizing module 126 may normalize at least a part of the plurality of sets of audio data by using the mixed normalization factor obtained at step S150 of the operational flowchart 300. For example, when the sets of audio data include at least a first set (e.g., the set F) and a second set (e.g., the set G), the normalizing module 126 may normalize the first set (e.g., the set F) by using the mixed normalization factor, which is mixed from at least the normalization factor of the first set (e.g., the set F) and the normalization factor of the second set (e.g., the set G). This example may correspond to the embodiments shown in FIGS. 5 and 6.

In another example, when the sets of audio data include at least a first set (e.g., the set I), a second set (e.g., the set J) and a third set (e.g., the set K), the normalizing module 126 may normalize the first set (e.g., the set I) by using the mixed normalization factor, which is mixed from at least the normalization factor of the second set (e.g., the set J) and the normalization factor of the third set (e.g., the set K). This example corresponds to the embodiment shown in FIG. 7. A set I of audio data normalized with the mixed normalization factor may be referred to as "mix-normalized set I."

The normalizing module 126 may perform the normalization by using z-score normalization. In an embodiment, the normalizing module 126 may normalize an audio data $x_A[t]$ at t-th time period by calculating the formula $(x_A[t] - m_{mix})/s_{mix}$.

At step S190 of the operational flowchart 300, an acoustic model is trained. The training module 128 may perform step S190 by using training data to train an acoustic model. The training data may include the normalized sets of audio data obtained at step S170 of the operational flowchart 300.

In an embodiment, the training data may include a normalized set A, a normalized set B, and a mix-normalized set A. In an embodiment, the training data may include a normalized set A, a normalized set B, a mix-normalized set A, and a mix-normalized set B.

The training data may include pairs of audio data and sound identification information as teaching data. The sound identification information may include phoneme information, characters, or text, e.g., machine-encoded text, that corresponds to audio in the paired audio data.

In an embodiment, the acoustic model may input audio data and may output sound identification information corresponding to the input audio data. The acoustic model may be a neural network such as a convolutional neural network or a deep neural network. The convolutional neural network may include one or more convolutional neural network layers, which may include one or more sets of convolutional layers and pooling layers. The convolutional neural network may also include one or more fully-connected layers. The convolutional neural network may further include other types of layers. The deep neural network may include a plurality of fully-connected layers and may optionally include other types of layers.

In an embodiment, the training module 128 may train the acoustic model by using distillation. In the embodiment, the training module 128 may minimize the KL-loss, where L=−sum $q(i|x_g[i])$ log $p(i|x_n[i])$, where q is a teacher model, p is a student model, $x_g[i]$ is an input to q, and $x_n[i]$ is an input to p.

At step S210 of the operational flowchart 300, audio data may be decoded. The decoding module 130 may perform the step S210 by decoding audio data by using the acoustic model. Thereby, the decoding module 130 may generate sound identification information from the audio data. In an embodiment, the decoding module 130 may transcribe the audio data to text using the acoustic model. The decoding module 130 may contain or have access to the trained acoustic model and may input newly received audio data into the trained acoustic model. As a result of inputting the newly received audio data into the trained acoustic model, the decoding module 130 may receive machine-encoded text as output of the trained acoustic model. The machine-encoded text includes those words that were spoken and recorded as a part of the audio data.

As explained in relation to FIGS. 1B-8, the audio data augmentation program 110*a*, 110*b* may train the acoustic model with training data normalized with the mixed normalization factor. Thereby the acoustic model may become more robust without needing to collect huge amounts of audio data and by using fewer computational resources. The steps of S110-S210 of the operational flowchart 300 shown in FIG. 3 may be performed by different apparatuses. For example, steps S110-S190 may be performed by a first apparatus and step S210 may be performed by a second apparatus.

For corroboration, tests were ran comparing (1) speech recognition performed using a model trained with audio data that is normalized in a mixed manner according to embodiments described herein and (2) speech recognition performed using a model trained with conventional audio data. The tests showed that the embodiments described herein improved the speech recognition performance for the trained model as indicated in the Table below.

|  | M0 | M1 | REL |
|---|---|---|---|
| TestB | 29.73 | 28.82 | −3.06 |
| TestPm | 17.56 | 16.90 | −3.75 |
| TestPs | 9.59 | 9.33 | −2.71 |

In the Table, M0 represents a speech recognition model that includes a unidirectional long short term memory that is trained with audio data that was not normalized with mixed normalization factors. M1 represents a speech recognition model that includes a unidirectional long short term memory model that is trained with audio data normalized with mixed normalization factors as described in the present embodiments. REL indicates the relative change in the character error rate (CER) that was achieved by the model M1 in comparison to M0. An incremental decoder was used for the tests. A hyper parameter was used with a=0 for the three tests which indicates that normalization factor for original audio data is used for calculating the mixed normalization factor for other audio data like occurs in the embodiment shown in FIG. 7.

TestB was performed with 14.7 hours from 6 subsets of audio data. TestPm was performed with 1.73 hours from 20 speakers. For the TestPm, data from the 20 speakers was concatenated and shuffled to simulate multiple speaker conversations. TestPs included original data of Pm and a single speaker.

The test results as indicated in the column indicate the improvement of 3.06% relative CER for the overall test set TestB, improved 3.75% for the multi-speaker test set TestPm, and improved 2.71% for the third test set TestPs.

It may be appreciated that FIGS. 1B-8 provide illustrations of some embodiments and do not imply any limitations with regard to how different embodiments may be implemented. Many modifications to the depicted embodiment(s) may be made based on design and implementation requirements.

Various embodiments of the present invention may be described with reference to flowcharts and block diagrams whose blocks may represent (1) steps of processes in which operations are performed or (2) modules of apparatuses responsible for performing operations. Certain steps and modules may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Figure 9:
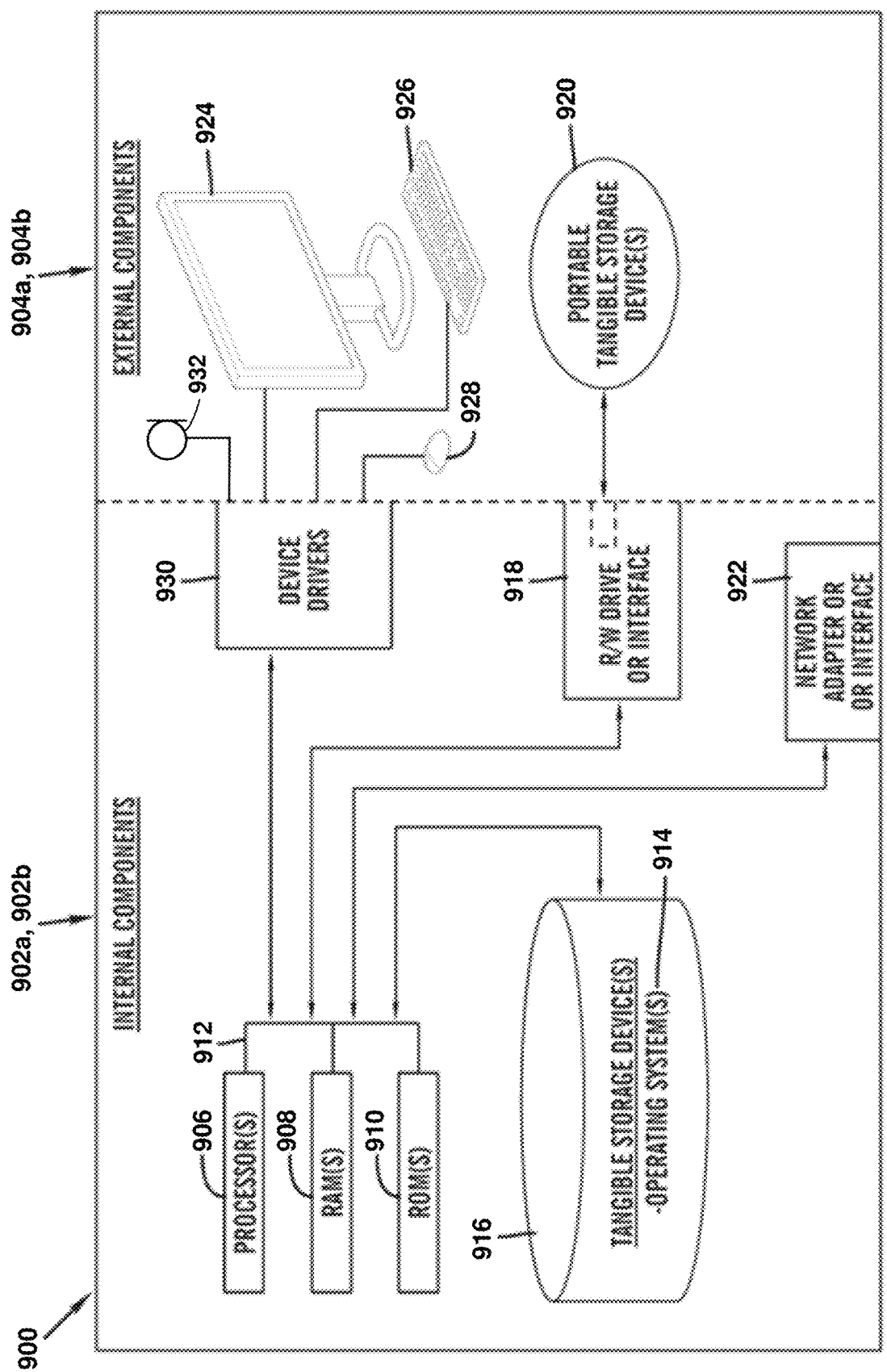
FIG. 9 is a block diagram of internal and external components of computers and servers depicted in FIG. 1 according to at least one embodiment.

FIG. 9 is a block diagram 900 of internal and external components of computers depicted in FIG. 1 in accordance with an illustrative embodiment of the present invention. It should be appreciated that FIG. 9 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, 902b and external components 904a, 904b illustrated in FIG. 9. Each of the sets of internal components 902a, 902b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the audio data augmentation program 110a in client computer 102, and the audio data augmentation program 110b in server 112, may be stored on one or more computer-readable tangible storage devices 916 for execution by one or more processors 906 via one or more RAMs 908 (which typically include cache memory). In the embodiment illustrated in FIG. 9, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, 902b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the audio data augmentation program 110a and 110b can be stored on one or more of the respective portable computer-readable tangible storage devices 920, read via the respective R/W drive or interface 918 and loaded into the respective hard drive 916.

Each set of internal components 902a, 902b may also include network adapters (or switch port cards) or interfaces 922 such as a TCP/IP adapter cards, wireless wi-fi interface cards, or 3G or 4G wireless interface cards or other wired or wireless communication links. The software program 108 and the audio data augmentation program 110a in client computer 102 and the audio data augmentation program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the audio data augmentation program 110a in client computer 102 and the audio data augmentation program 110b in network server computer 112 are loaded into the respective hard drive 916. The network may comprise copper wires, optical fibers, wireless transmission, routers, firewalls, switches, gateway computers and/or edge servers.

Each of the sets of external components 904a, 904b can include a computer display monitor 924, a keyboard 926, a computer mouse 928, and a microphone 932. External components 904a, 904b can also include touch screens, virtual keyboards, touch pads, pointing devices, and other human interface devices. Each of the sets of internal components 902a, 902b also includes device drivers 930 to interface to computer display monitor 924, keyboard 926, computer mouse 928, and microphone 932. The device drivers 930, R/W drive or interface 918 and network adapter or interface 922 comprise hardware and software (stored in storage device 916 and/or ROM 910).

The above-explained program or software modules may be stored in the computer readable media on or near the computer 102. In addition, a recording medium such as a hard disk or a RAM provided in a server system connected to a dedicated communication network or the Internet can be used as the computer readable media, thereby providing the program to the computer 102 via the communication network 116.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
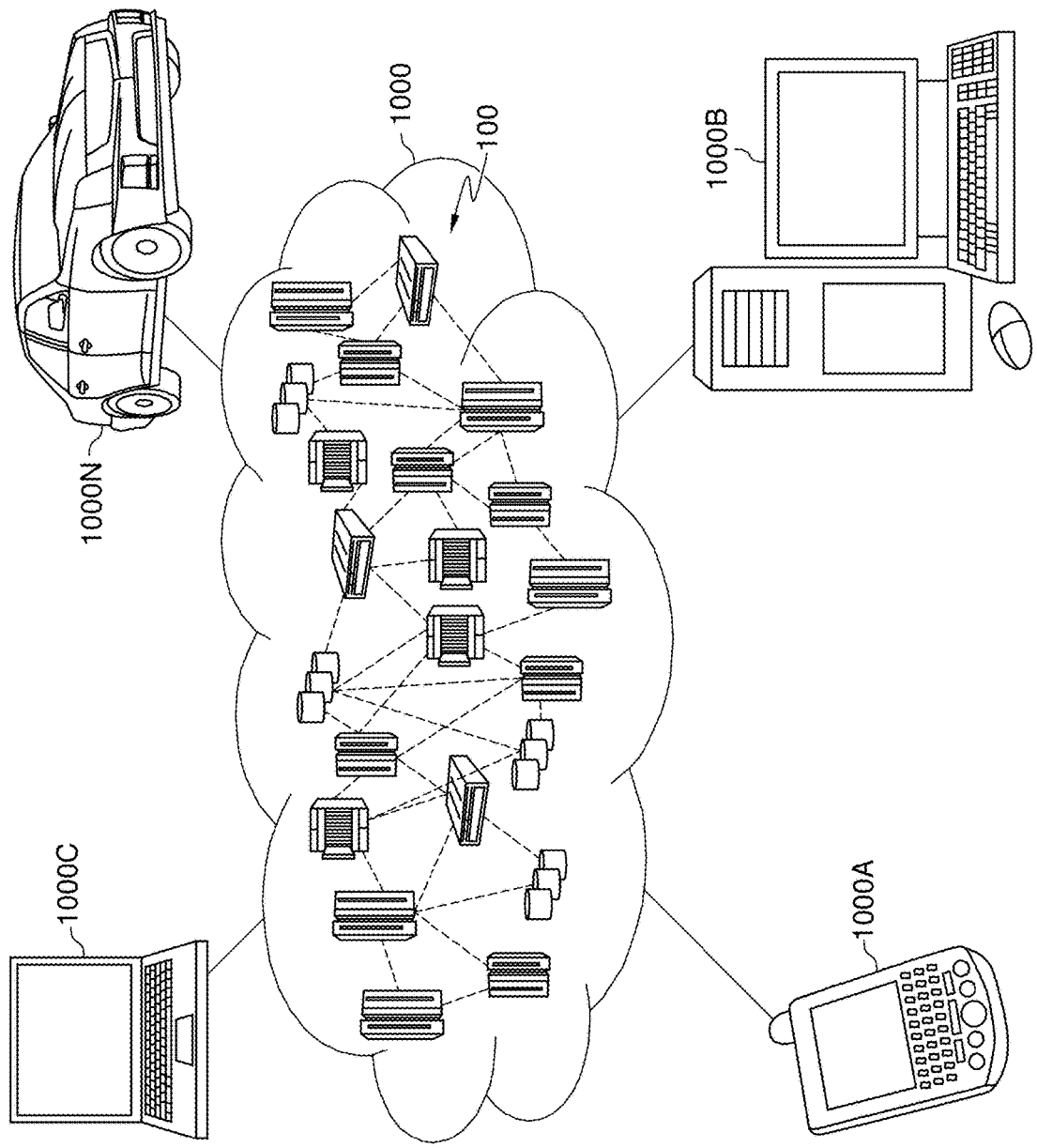
FIG. 10 is a block diagram of an illustrative cloud computing environment including the computer system depicted in FIG. 1, in accordance with an embodiment of the present disclosure.

Referring now to FIG. 10, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 10 are intended to be illustrative only and that computing nodes 100 and cloud computing environment 1000 can communicate with any type of computerized device over any type of network and/or network addressable connection (e.g., using a web browser).

Figure 11:
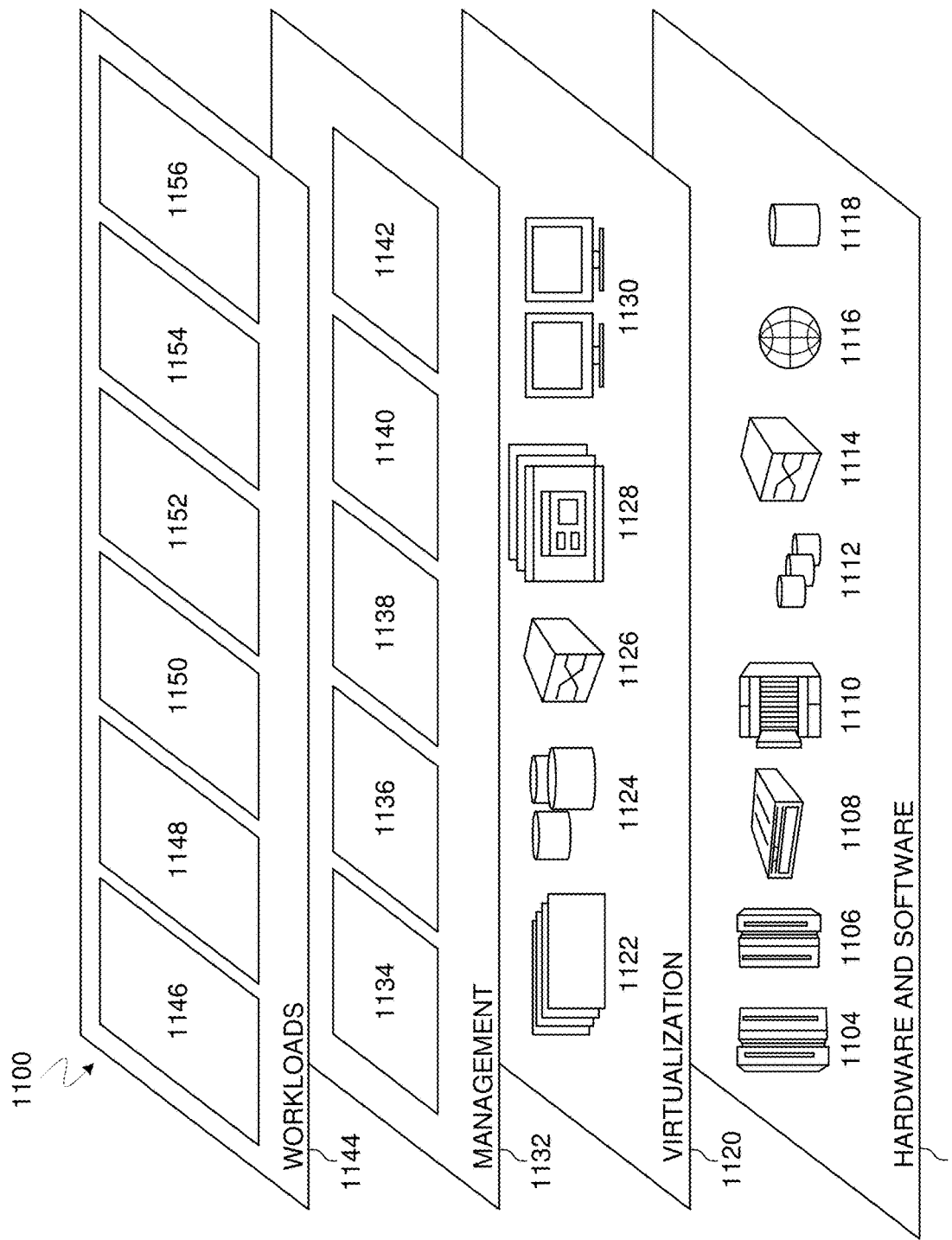
FIG. 11 is a block diagram of functional layers of the illustrative cloud computing environment of FIG. 10, in accordance with an embodiment of the present disclosure.

Referring now to FIG. 11, a set of functional abstraction layers 1100 provided by cloud computing environment 1000 is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and audio data augmentation 1156. An audio data augmentation program 110a, 110b provides a way to increase robustness of speech recognition technology to better recognize speech that comes from different speakers who have different cepstral means and variances.

While the embodiments of the present invention have been described, the technical scope of the invention is not limited to the above described embodiments. It will be apparent to persons skilled in the art that various alterations and improvements can be added to the above-described embodiments. It should also apparent from the scope of the claims that the embodiments added with such alterations or improvements are within the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A method for acoustic data augmentation, the method comprising:
    obtaining sets of audio data from different sources, wherein each of the respective sets comprises audio values with respect to time values over a respective time period;
    calculating a respective normalization factor for at least four sets of the sets of audio data, wherein the audio values of the at least four sets are for a same type of audio value;
    calculating a mixed normalization factor by using the at least four calculated normalization factors, wherein the mixed normalization factor is located at any point within a quadrilateral that includes the at least four calculated normalization factors;
    normalizing at least two sets of the at least four sets by using the mixed normalization factor, wherein the normalized at least two sets together constitute training data; and
    training an acoustic model by using the training data.

2. The method of claim 1, wherein the different sources are different speakers.

3. The method of claim 1, wherein the audio data is selected from a group consisting of raw speech data, log Mel-filtered spectra generated from raw speech data, and Mel-Frequency Cepstrum Coefficients transformed from raw speech data.

4. The method of claim 1, wherein the calculating the normalization factor for a first set of the at least four sets is performed by using z-score normalization; and
    wherein the normalization factor for the first set comprises a respective mean value and a respective standard deviation for the z-score normalization.

5. The method of claim 1, wherein a first set of the at least four sets of audio data is from a first source of the different sources;
    wherein a second set of the at least four sets of audio data is from a second source of the different sources; and
    wherein a third set of the at least four sets of audio data is from a third source of the different sources.

6. The method of claim 1, further comprising decoding audio data by using the trained acoustic model to generate sound identification information.

7. The method of claim 1, wherein the data sets are recorded under different acoustic environments.

8. The method of claim 1, wherein the calculating the mixed normalization factor comprises applying weights to the at least four calculated normalization factors, the weights in total adding to 1.

9. The method of claim 1, wherein the data sets are grouped via unsupervised clustering.

10. A computer system for acoustic data augmentation, the computer system comprising:
one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
obtaining sets of audio data from different sources, wherein each of the respective sets comprises audio values with respect to time values over a respective time period;
calculating a respective normalization factor for at least four sets of the sets of audio data, wherein the audio values of the at least four sets are for a same type of audio value;
calculating a mixed normalization factor by using the at least four calculated normalization factors, wherein the mixed normalization factor is located at any point within a quadrilateral that includes the at least four calculated normalization factors;
normalizing at least two sets of the at least four sets by using the mixed normalization factor, wherein the normalized at least two sets together constitute training data; and
training an acoustic model by using the training data.

11. The computer system of claim 10, wherein the different sources are different speakers.

12. The computer system of claim 10, wherein the audio data is selected from a group consisting of raw speech data, log Mel-filtered spectra generated from raw speech data, and Mel-Frequency Cepstrum Coefficients transformed from raw speech data.

13. The computer system of claim 10, wherein the calculating the normalization factor for a first set of the at least four sets is performed by using z-score normalization; and
wherein the normalization factor for the first set comprises a respective mean value and a respective standard deviation for the z-score normalization.

14. The computer system of claim 10, wherein the data sets are recorded under different acoustic environments.

15. A computer program product for acoustic data augmentation, the computer program product comprising a computer readable storage medium having program instructions embodied therewith, wherein the program instructions are executable by a computer system to cause the computer system to perform a method comprising:
obtaining sets of audio data from different sources, wherein each of the respective sets comprises audio values with respect to time values over a respective time period;
calculating a respective normalization factor for at least four sets of the sets of audio data, wherein the audio values of the at least four sets are for a same type of audio value;
calculating a mixed normalization factor by using the at least four calculated normalization factors, wherein the mixed normalization factor is located at any point within a quadrilateral that includes the at least four calculated normalization factors;
normalizing at least two sets of the at least four sets by using the mixed normalization factor, wherein the normalized at least two sets together constitute training data; and
training an acoustic model by using the training data.

16. The computer program product of claim 15, wherein the different sources are different speakers.

17. The computer program product of claim 15, wherein the audio data is selected from a group consisting of raw speech data, log Mel-filtered spectra generated from raw speech data, and Mel-Frequency Cepstrum Coefficients transformed from raw speech data.

18. The computer program product of claim 15, wherein the calculating the normalization factor for a first set of the at least four sets is performed by using z-score normalization; and
wherein the normalization factor for the first set comprises a respective mean value and a respective standard deviation for the z-score normalization.

19. The computer program product of claim 15, wherein the calculating the mixed normalization factor comprises applying weights to the at least four calculated normalization factors, the weights in total adding to 1.

20. The computer program product of claim 15, wherein the data sets are recorded under different acoustic environments.

* * * * *